United States Patent [19]

Strauss et al.

[11] Patent Number: 4,676,850
[45] Date of Patent: Jun. 30, 1987

[54] METHOD OF MAKING AN ELECTRICAL CABLE FOR UNDERCARPET WIRING SYSTEMS

[75] Inventors: Richard F. Strauss, Morrisville, Pa.; Phillip Herb, Somerville, N.J.; Peter Noorily, Bridgewater, N.J.; Julio Rodrigues, Linden, N.J.

[73] Assignee: Thomas & Betts Corporation, Raritan, N.J.

[21] Appl. No.: 767,311

[22] Filed: Aug. 19, 1985

[51] Int. Cl.⁴ .............................................. H01B 13/24
[52] U.S. Cl. ........................................ 156/55; 156/56; 174/117 F; 174/117 FF; 428/383
[58] Field of Search ................. 156/55, 56; 174/117 F, 174/117 FF; 428/383

[56] References Cited

U.S. PATENT DOCUMENTS

| | | |
|---|---|---|
| 247,321 | 9/1981 | Delany . |
| 3,013,109 | 12/1961 | Gorman et al. .................. 174/113 |
| 3,032,604 | 5/1962 | Timmons ........................ 174/115 |
| 3,322,889 | 5/1967 | Bird et al. ...................... 174/113 |
| 3,439,111 | 4/1969 | Miracle et al. ................. 174/107 |
| 3,600,500 | 8/1971 | Schoerner et al. ......... 174/117 F X |
| 3,614,300 | 10/1971 | Wilson ........................... 174/110 |
| 3,735,022 | 5/1973 | Estep ............................. 174/117 |
| 3,775,552 | 11/1973 | Schumacher .................. 174/105 |
| 3,960,430 | 6/1976 | Bunnell et al. ................. 339/97 |
| 4,096,346 | 6/1978 | Stine et al. ..................... 174/36 |
| 4,219,928 | 9/1980 | Kuo ................................ 29/868 |
| 4,234,759 | 11/1980 | Harlow ........................... 174/104 |
| 4,240,687 | 12/1980 | Bunnell et al. ................. 339/99 |
| 4,240,688 | 12/1980 | Sotolongo ...................... 339/122 |
| 4,263,474 | 4/1981 | Tennant ......................... 174/71 |
| 4,283,593 | 8/1981 | Piasecki et al. ............... 174/36 |
| 4,308,421 | 12/1981 | Bogese, II .................. 174/117 F X |
| 4,319,075 | 3/1982 | Willette .......................... 174/117 |
| 4,417,096 | 11/1983 | Willette .......................... 174/71 |
| 4,463,998 | 8/1984 | Reavis et al. .................. 339/40 |
| 4,467,138 | 8/1984 | Brorein ........................... 174/115 |
| 4,487,997 | 12/1984 | Ditchfield .................. 174/117 F X |
| 4,490,904 | 1/1985 | Moyher ........................... 29/864 |
| 4,503,124 | 3/1985 | Keane et al. ................... 428/383 X |

FOREIGN PATENT DOCUMENTS

| | | |
|---|---|---|
| 132703 | 10/1981 | Japan . |
| 58-109108 | 7/1983 | Japan . |
| 1386065 | 9/1972 | United Kingdom ............ 174/117 F |
| 2144260 | 2/1985 | United Kingdom . |

OTHER PUBLICATIONS

Hubbell System PDC Application Installation Manual, 28 pages, published prior to July 1984, p. 4.
Wiremold® Fanton Flex™ Undercarpet Wiring Systems, 12 pages, 1982, p. 4.

Primary Examiner—Robert A. Dawson
Attorney, Agent, or Firm—Robert M. Rodrick; Salvatore J. Abbruzzese

[57] ABSTRACT

The flat multiconductor cable contains live, neutral and ground conductors lying generally parallel to each other and in side by side, single-plane relation. The live and neutral conductors are sealably surrounded by a relatively hard, polyetherimide material that is substantially free from attack from calcium hydroxide. An outer jacket or casing of polyvinylchloride (PVC) sealably surrounds the polyetherimide layers and contacts the ground conductor. The PVC is substantially free from attack in an alkaline environment. The polyetherimide layers are extruded over the live and neutral conductors providing a seal therearound and thereby a barrier to moisture. The PVC layer is then extruded over the conductors providing a further seal around the polyetherimide layers.

5 Claims, 2 Drawing Figures

METHOD OF MAKING AN ELECTRICAL CABLE FOR UNDERCARPET WIRING SYSTEMS

FIELD OF THE INVENTION

The present invention relates generally to a method of making an electrical cable and more particularly to a flat multiconductor cable for use in an undercarpet wiring system.

BACKGROUND OF THE INVENTION

Undercarpet wiring systems for power, data and telephone applications have been in commercial use for several years. One such wiring system is manufactured by the assignee of the subject invention and is sold under the trademark VERSA-TRAK. The wiring system for power applications, for example, typically includes a flat cable comprising three, four or five conductors encased in a jacket or casing of insulation. A conductive shield overlies the cable for mechanical and electrical protection and is electrically connected to the ground conductor such that the shield and ground conductor are at the same ground potential. In the VERSA-TRAK ® system, the ground shield is connected intermittently along the cable length to the ground conductor by welds. An insulative film is often attached to the bottom of the casing for further cushioning and abrasion shielding. U.S. Pat. Nos. 4,219,928 and 4,283,593, both of which are assigned to the assignee of the present invention, describe a known electrical cable asssembly for use in undercarpet wiring systems.

In use, the cable assembly is adapted to be placed on a floor surface in commercial buildings and thereafter covered with carpet squares. As the cable with shielding is relatively thin (generally less than 1/16 inch), the wiring system remains unobtrusive once installed. It has been found through experience and tests that certain elements in the environment to which the undercarpet wiring system is exposed could present problems in use. These elements include dirt particles or other debris and water. During installation or use, particles of dirt may get lodged between the cable casing and the metallic shield or between the cable and the floor thereby increasing the potential for puncturing the cable and either damaging the system or shutting down the system by tripping a circuit breaker through a short circuit. In addition, and in particular where the undercarpet cable is placed on a concrete floor on the grade level of a building, water may be vaporized from the concrete surface and be retained under the carpet after condensing. The water may combine with the chemicals in the concrete to form an alkaline solution consisting mainly of calcium hydroxide. Calcium hydroxide and other alkaline solutions are known to attack certain materials, such as polyesters, which are commonly used in the undercarpet cable insulation because they have good dielectric and hardness properties. It is known, for example as disclosed in the above-referenced patents, to form a composite jacket of insulation with a harder layer of polyester, such as MYLAR film (MYLAR is a trademark of E. I. Du Pont de Nemours) on the jacket exterior with a softer layer of polyvinylchloride on the interior of the jacket. It is also known that undercarpet cables use one or two layers of MYLAR film as the insulation jacket, the film being laminated to the conductors.

Steps have been taken in the industry to ensure safe and reliable undercarpet systems. For example, as a means of providing a moisture barrier, especially on grade level concrete floors, a separate strip of polyvinylchloride (PVC) is laid on the floor beneath the cable (or beneath the abrasion shield). This PVC strip is several inches wider than the width of the cable and serves as a moisture barrier to water or calcium hydroxide when present on the floor. This PVC strip further serves as an additional cushion for minimizing puncturing of the cable from dirt particles between the cable and the floor.

Other attempts not presently adapted commercially include efforts at sealing the edges of the cable assembly so that water, dirt and other debris may be kept outside the cable assembly. One such approach is shown in U.S. Pat. Nos. 4,417,096 and 4,319,075, both issued to Willette and assigned to AMP, Incorporated. In addition to costs, obtaining entrance to the sealed cable assembly for making taps or splices, and then re-sealing the cable assembly present problems.

While current undercarpet systems have been improved for safety and reliability, there is a continued need for providing solutions to the water and debris concerns in a cost effective manner.

SUMMARY OF THE INVENTION

It is an object of the present invention to provide a method of making an improved electrical cable for use in an undercarpet wiring system.

It is another object of the invention to provide an improved method of making an electrical cable that is substantially free from attack in alkaline solutions.

In accordance with a preferred form of the invention, an electrical cable for use in an undercarpet system that is likely to be exposed to an alkaline environment includes the steps of providing a plurality of electrical conductors serving as live, ground and neutral conductors and covering such conductors with an outer casing of insulation that is substantially free from attack in the alkaline solution. A moisture seal at least around the live and neutral conductors is provided interiorly of the casing. In a particular practice of the invention, the outer casing and the material around the live and neutral conductors are substantially free from attack from an alkaline solution containing calcium hydroxide.

DETAILED DESCRIPTION OF THE PREFERRED EMBODIMENT

Figure 1:
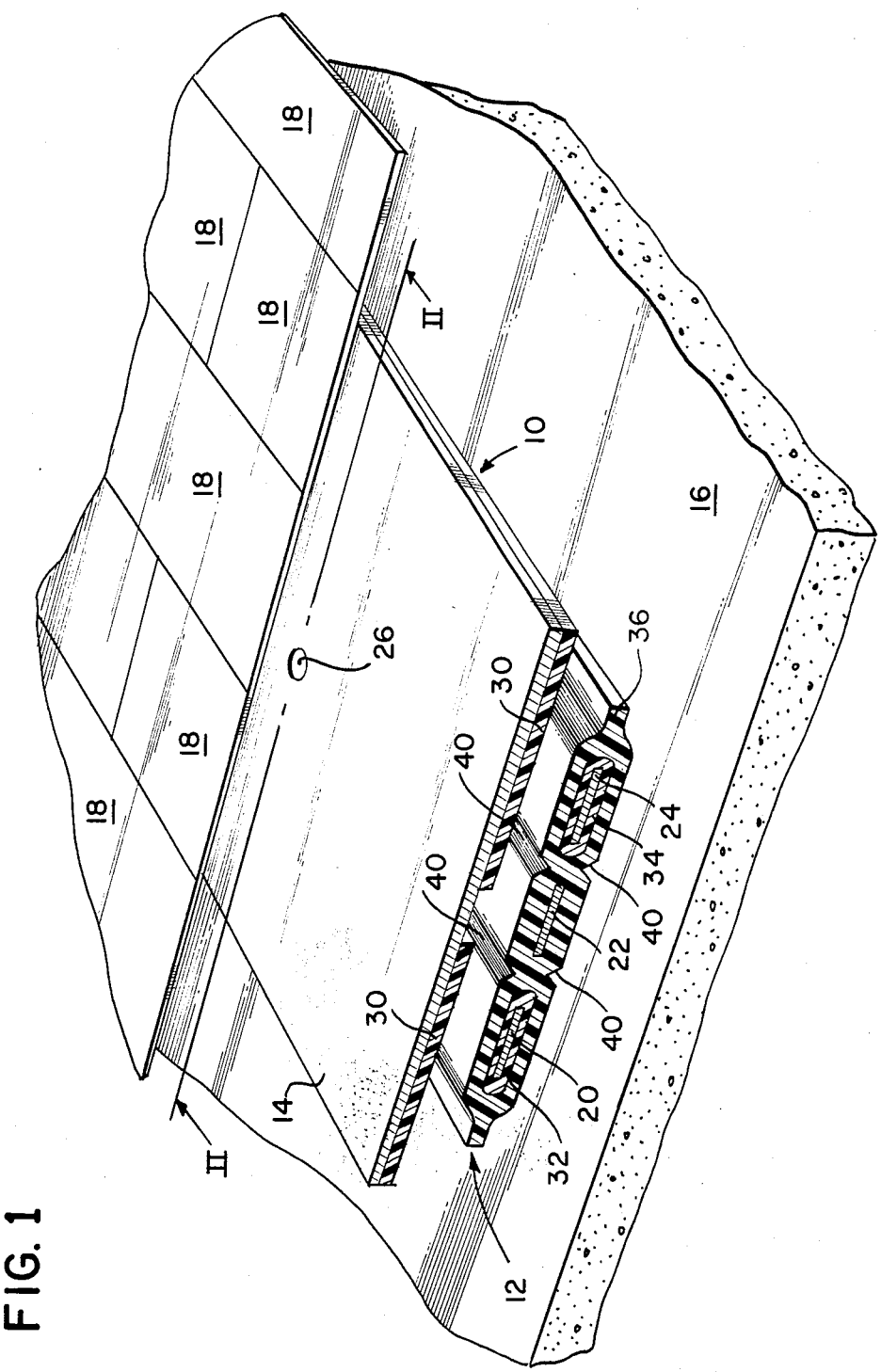
FIG. 1 is a perspective view of a cable assembly constructed in accordance with one aspect of the present invention.

Referring now to the drawing in FIG. 1, there is shown an electrical cable assembly 10 including a flat, flexible elongate multiconductor cable 12 covered by a self-sustaining electrically conductive member constituting a metallic ground shield 14. The cable assembly 10 is adapted to be installed on a floor surface such as a concrete surface 16 in a commercial building and to be covered by carpet squares 18 or other similar types of floor covering. As such, cable assembly 10 may be used in an undercarpet wiring system which is becoming more popular in building wiring applications.

Figure 2:
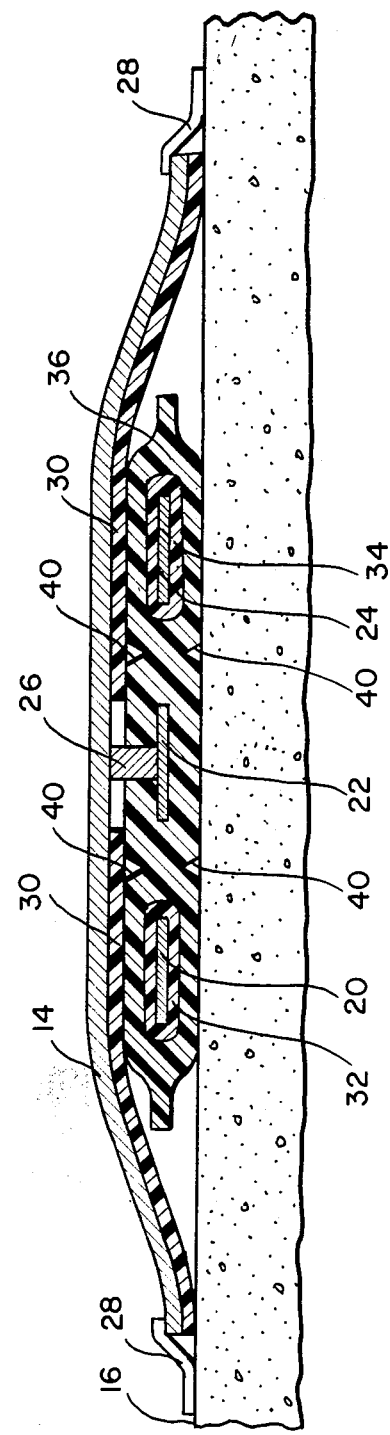
FIG. 2 is a cross-sectional view as seen along viewing lines II—II of FIG. 1.

With reference still to FIG. 1 and also now to FIG. 2, the details of the cable assembly may be described. The multiconductor cable 12 contains a plurality of elongate electrical conductors 20, 22, and 24, extending generally parallel to each other and in side by side, single-plane relation. In the cable illustrated, conductor 20 serves as a live conductor, which for example, may be connected to A, B or C phase for load balancing purposes. Conductor 22 located adjacent to the live conductor, serves as a ground, and conductor 24 serves as a neutral conductor. It should also be understood that other multiconductor cables having more than three conductors such as four conductors (where there may be two live conductors) or five conductors (where there may be three live conductors) are also contemplated in the present invention. In the preferred embodiment, conductors 20, 22 and 24 are of generally rectangular cross-section having a thickness of about 0.006 inch and formed of copper.

The metallic shield 14 is made from a thin flexible sheet of suitably electrically conductive metal, preferably copper, substantially the same material as the conductors 20, 22 and 24. The shield 14 is electrically and mechanically secured to the ground conductor 22 at intermittent locations along the length of the cable 12. The intermittent spacings are approximately twenty-seven (27) inches in the preferred arrangement although other suitably spaced distances may be used. In the preferred cable construction, securement of the ground shield 14 and ground conductor is effected by a weld 26 as more particularly shown and described in aforementioned, commonly-owned U.S. Pat. No. 4,283,593. It should be understood as set forth in the '593 patent that other securement means, such as mechanical fasteners and rivets or the like may be used in securing the shield 14 and the ground conductor 22 such that they would be at the same electrical potential. Between secured locations (welds 26) the shield 14 is not secured to the cable 12 and is readily separable therefrom so as to facilitate taps or splices to other cable assemblies.

The metallic shield is preferably made on the order of 0.006 inch thick and has a width at least sufficient to cover the live and neutral conductors and extend beyond the longitudinal edges of the cable 12. As such, the wider shield provides a "feathering" effect in minimizing the perceived height of the cable assembly once installed, the shield edges being attached to the floor surface by a suitable adhesive tape 28 or the like. The shield may be suitably plated with nickel or the like to increase corrosion resistance. The underside of the shield 14 may contain an insulative sheet 30 disposed on either side of the ground conductor 22. Sheets 30 may be made of polyvinylchloride, about 0.004 inch thick and laminated to the shield 14. These sheets 30 act as cushions to any debris or dirt particles that may lodge between the shield 14 and the cable 12 and thereby help to minimize puncture of the cable.

In the preferred form of the invention, the live conductor 20 and the neutral conductor 24 are completely, individually surrounded with a layer 32, 34 of relatively hard, insulative material having good dielectric strength. The ground conductor 22 remains free from such a layer of insulation. An outer casing 36 of insulative material, also of good dielectric strength, surrounds the insulative layers 32, 34 and the ground conductor 22. In accordance with the invention, the cable is adapted to be substantially resistant to attack in an alkaline environment. As noted hereinabove, an undercarpet cable is likely to encounter an environment containing alkaline solutions, particularly calcium hydroxide which may form as a result of water combining with calcium in concrete floors, mainly at grade levels in buildings. Accordingly, the outer jacket 36 is selected to be substantially free from attack in such alkaline environments. As used herein, the phrase "substantially free from attack" is intended to mean that the material will not crack, decompose or weaken in its normal use. In the preferred construction, polyvinylchloride (PVC) is selected for its ability to be substantially free from attack in alkaline solutions.

In addition to alkali resistance capability, the cable of the present invention is adapted to provide improved puncture resistance over the known commercially available cables, especially in an alkaline environment. In the particularly preferred form of the cable construction, the material of the insulative layers 32, 34 is a polyetherimide, such as that sold under the trademark ULTEM and available from General Electric Company, One Plastics Avenue, Pittsfield, Mass. ULTEM material is also preferred as it has excellent resistance against attack from alkaline solutions containing calcium hydroxide. The ULTEM layers 32, 34 are provided on the conductors at a thickness of about 0.005 inch. The casing thickness around the layers 32, 34 is about 0.007 inch and the overall casing thickness surrounding the conductors is about 0.030 inch. In the present cable configuration, the outer casing of PVC is not attacked or otherwise weakened by alkaline solutions, maintaining thereby the puncture resistance of the cable in its intended environment. On the other hand, in the known cable structures, an exterior polyester film weakens when exposed to alkaline solutions, thereby permitting the cable insulation to be more easily punctured under external forces of a particle or the like.

In assembly of the cable assembly, the ULTEM layers 32, 34 are preferably extruded onto the conductors 20 and 24 by known extrusion techniques. The extruded layers adhere to the copper conductors, eliminating thereby the need for separate adhesives and generally providing a seal between the layers 32, 34 and the conductors 20, 24 and thereby a moisture barrier. The casing 36 is also then monolithically placed by extrusion over the layers 32, 34 and over the ground conductor 22. Good adherence and thereby a good seal is also obtained between the casing 36 and the layers 32 and 34. As there is no ULTEM material around the ground conductor 22, portions of the relatively soft, flexible polyvinylchloride at the weld locations are readily removable without interrupting the moisture seals around the live conductor 20 and neutral conductor 24 to facilitate welding of the ground shield 14 to the ground conductor 22 at the intermittent spacings. The casing 36 may be provided with score marks 40 located between the conductors 20, 22 and 24 on both sides of the casing 36, creating thinned casing sections so as to facilitate separation of the cable. Splitting the cable along the score marks 40 will enable separation of the cable into sections, each containing a conductor for subsequent termination or connection purposes.

It can now be appreciated that the cable making method of the present invention provides an improvement for undercarpet wiring systems. While the preferred embodiments of the assembly method have been described herein, it should be understood that other variations may be made thereto without departing from the contemplated scope of the invention. As such, the preferred embodiments described herein are intended in an illustrative and not a limiting sense. The true scope of the invention is set forth in the claims appended hereto.

We claim:

1. A method of making an electrical cable for use in an undercarpet wiring system wherein said cable is likely to be exposed to an alkaline solution containing calcium hydroxide, comprising the steps of:
   (a) arranging a plurality of elongate electrical conductors including live, ground and neutral conductors in spaced, side by side, substantially parallel disposition;
   (b) sealably covering only said live and said neutral conductors with a layer of insulative material that is substantially free from attack from calcium hydroxide; and
   (c) monolithically placing an outer casing of insulative material that is substantially free from attack from calcium hydroxide over said conductors in a manner adheringly providing a seal around the layer covering said live and said neutral conductors and in a manner substantially surrounding and contacting said ground conductor, a portion of said casing contacting said ground conductor being relatively thin and readily removable to provide subsequent electrical connection to said ground conductor.

2. A method of making an electrical cable according to claim 1, wherein the material of said outer casing comprises polyvinylchloride.

3. A method of making an electrical cable according to claim 2, wherein the material covering at least said live and said neutral conductors comprises polyetherimide.

4. A method of making an electrical cable according to claim 1, wherein said live and said neutral conductors are separably sealably covered by an individual layer of said insulative material.

5. A method of making an electrical cable according to claim 4, wherein said separate layers of insulative material are extruded over said live and said neutral conductors and said outer casing is monolithically placed by extrusion.

* * * * *